United States Patent [19]

DeJardins

[11] Patent Number: 4,487,337
[45] Date of Patent: Dec. 11, 1984

[54] AUTOMATIC BEVERAGE VENDING MACHINE

[75] Inventor: Andre P. DeJardins, Orsay, France

[73] Assignee: Societe Industrielle D'Appareils Automatiques, Chartres, France

[21] Appl. No.: 311,201

[22] Filed: Oct. 14, 1981

[30] Foreign Application Priority Data

Oct. 14, 1980 [FR] France ............................... 80 21979

[51] Int. Cl.³ .............................................. B67D 5/56
[52] U.S. Cl. .................................. 222/129.3; 222/132; 222/160; 222/156; 222/236; 222/108; 312/333
[58] Field of Search .................... 222/129.1–129.4, 222/132, 144.5, 145, 173, 181, 185, 160, 164, 165, 154, 156, 157, 226, 236, 566, 567, 108, 153, 180; 221/96; 312/330 R, 333, 346, 348, 350

[56] References Cited

U.S. PATENT DOCUMENTS

| | | | |
|---|---|---|---|
| 393,852 | 12/1888 | Parrish | 222/108 |
| 508,326 | 11/1893 | Lippincott | 222/165 X |
| 508,327 | 11/1893 | Lippincott | 222/165 X |
| 613,678 | 11/1898 | Herron | 222/165 X |
| 1,774,236 | 8/1930 | Ohnstrand | 312/333 X |
| 2,081,725 | 5/1937 | Ainsa | 222/157 X |
| 2,275,703 | 3/1942 | Trester et al. | 222/160 |
| 2,520,380 | 8/1950 | Wegman | 222/108 |
| 2,848,293 | 8/1958 | Jurgens et al. | 312/333 X |
| 3,385,569 | 5/1968 | Bookout | 222/129.4 X |
| 3,841,533 | 10/1974 | Carroll et al. | 222/567 X |
| 4,143,795 | 3/1979 | Casebier | 222/143 |

FOREIGN PATENT DOCUMENTS

| | | | |
|---|---|---|---|
| 569604 | 1/1959 | Canada | 222/236 |
| 1133586 | 7/1962 | Fed. Rep. of Germany | 222/129.4 |
| 2032451 | 11/1970 | France | |
| 615922 | 1/1961 | Italy | 222/129.4 |
| 1325478 | 8/1973 | United Kingdom | |

Primary Examiner—Stanley H. Tollberg
Assistant Examiner—George Pyryt
Attorney, Agent, or Firm—Beveridge, DeGrandi & Kline

[57] ABSTRACT

The hoppers (2) containing the powder products have a parallelepiped shape and are mounted side by side so that they can be moved by sliding on a slideway support (3). They are maintained in position by locking tabs (6). A plate forming a pan (38) is also mounted so as to be moved by sliding on horizontal slideways. The filling, and also the servicing and cleaning of the machine are thus made much easier.

16 Claims, 3 Drawing Figures

AUTOMATIC BEVERAGE VENDING MACHINE

The present invention relates to an automatic beverage vending machine and is more especially concerned with the means of storing the powder products inside such a vending or dispensing machine.

It is known that machines enabling hot or cold drinks to be dispensed generally comprise containers in their top section which frequently take on an overall cylindrical shape and which are designed to contain the powder products which must be distributed to the various mixing appliances in order to produce the required hot or cold beverages, with suitable liquids.

In these conventional-type appliances many difficulties arise in loading the powder products. In particular it is is essential, in order to fill the containers, to demount them in order to remove them from the appliance, which frequently leads to the products being splashed and therefore means that the appliance has to be cleaned. This results in a substantial loss of time for the user who has to carry out the maintenance and cleaning of the machines and who frequently operates several hundred machines a day.

The object of this invention is an automatic beverage dispensing or vending machine which makes it very much easier to operate it and in particular to fill it with powder products, as well as to maintain and clean these machines, which must always be kept in a perfectly hygienic and clean condition. The present invention also has the object, by facilitating the maintenance, the filling and the cleaning of the automatic vending machines, of permitting a considerable saving of time for the operator.

The automatic beverage vending machine according to the invention comprises a plurality of hoppers containing powder products, selective means of extracting these powder products, means of mixing these powder products with the appropriate liquids and means for delivering the mixture in cups dispensed automatically. According to the invention the machine has a slideway support to take by sliding the various hoppers containing the powder products. The hoppers are made in a parallelepiped shape and are installed side by side so that they can be moved by sliding and thus be filled without them being removed from the appliance.

The slideway support is preferably installed in the machine in such a manner as to leave a free space above the hoppers making it easy to fill them. Furthermore the support is preferably installed so that the front faces of all the hoppers are in the same plane when they are in the position of use, with the hoppers taking up the greater part of the width of the appliance.

The front faces of the hoppers preferably have a transparent graduated window making it simple to assess the level of the product in each hopper.

The slideway support advantageously comprises several locking tabs, each of which can pivot between a natural position in which it blocks sliding movement of two adjacent hoppers and a position, which can be obtained by hand, in which it allows movement of a single hopper. One locking tab is preferably provided for two adjacent hoppers.

Each hopper preferably comprises, near to its back wall, a stop means which may be advantageously formed by a rib or shoulder engaging with one of the locking tabs in order to prevent the hopper falling out in its sliding movement towards the front of the machine.

In this way it is easy to fill the hoppers by moving one of the locking tabs which enables one of the hoppers to be slid part way out until it butts against the same locking tab which drops back under its own weight to engage with the stop rib of the said hopper.

The powder products are extracted by means of a rotary conveyor screw located inside each hopper near its bottom wall and driven in rotation so as to move the powder product up to an opening made in the front face of the hopper where the product is taken up by a dispensing tube connected to this opening.

If a hopper is designed to dispense a product which tends to absorb moisture, it is known that it is necessary to provide for internal scraping means so that the dispenser screw does not very quickly rotate in a tunnel or hole formed inside the powder product. In this case the scraping device preferably comprises a toroid-shaped element made by winding a rigid wire in a spiral having roughly the same pitch as the conveyor screw and meshing with this screw. Thus the rotation of the conveyor screw causes rotation of this toroid-shaped element round a shaft supported by bearings integrated into the hopper side walls. The toroid-shaped element preferably has a diameter which enables it to take up roughly the greater part of the internal hopper space.

The dispensing tubes, which are made advantageously in the form of elbows, comprise means of locking in the angular position by detent so that they can only be mounted in a preset position for each hopper.

The vending machine according to the invention also preferably comprises a pan-shaped plate taking up inside the machine roughly the same width as all the hoppers together and installed on slideways so that it can be moved by sliding beneath the mixing means. In this way it is possible, when filling the various hoppers, to move the said pan forwards so that any overflow of the powder products does not risk fouling the lower section of the machine. The plate forming the pan preferably has a housing for a removable receptacle designed to take the cups which are automatically dispensed for filling. Cleaning of the pan-shaped plate is easy and is facilitated by a slight slope on the side portions of the pan in the direction of the housing for the cup receptacle.

The invention will be more clearly understood on studying the detailed description of a specific embodiment taken as a non-limiting example and illustrated by the appended drawings, in which.

Figure 1:
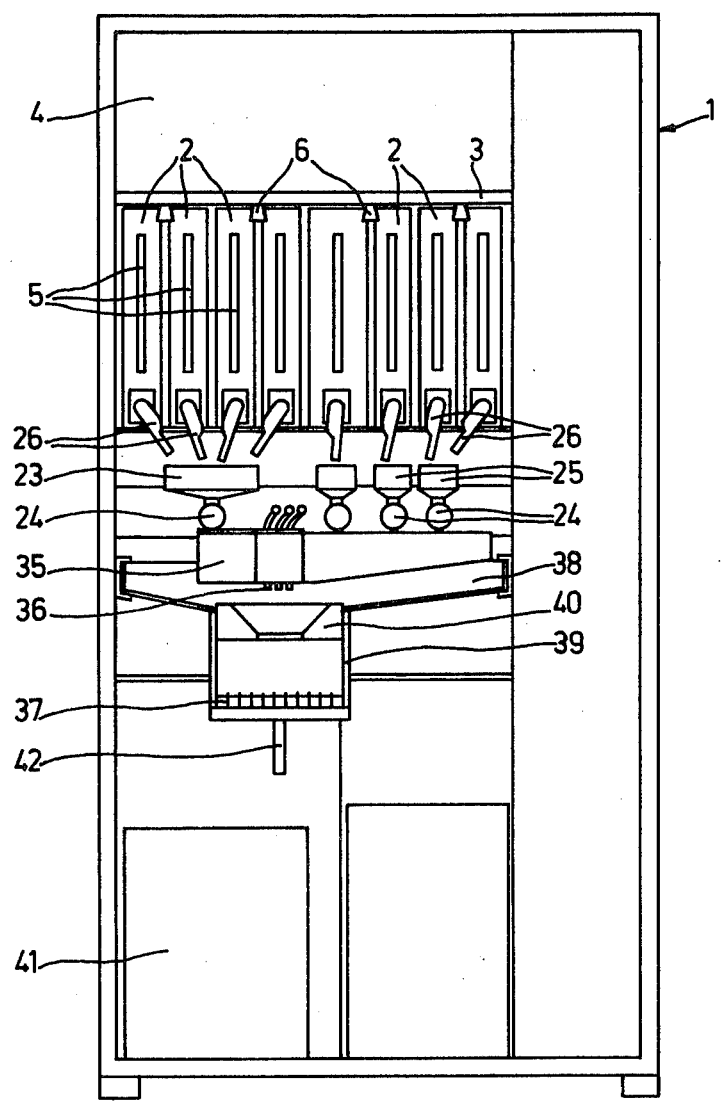
FIG. 1 is a schematic elevation view of the inside of an automatic beverage dispensing or vending machine according to the invention, showing all its components.

As shown in FIG. 1 the machine comprises a cabinet marked 1 overall closed by a door which is not shown in the figure and containing the machine's various components. A row of hoppers 2 of parallelepiped shape is located in the top of the cabinet 1, the hoppers being mounted side by side and taking up the greater part of the width of the cabinet 1. The hoppers 2 are mounted on a slideway support 3 so that they can be moved by sliding forward for filling. The hoppers 2 are mounted on the support 3 in such a position that the a free space 4 remains inside the cabinet 1 making it easier to load the various hoppers, the top faces of which are open, as can be seen in FIG. 2.

Figure 2:
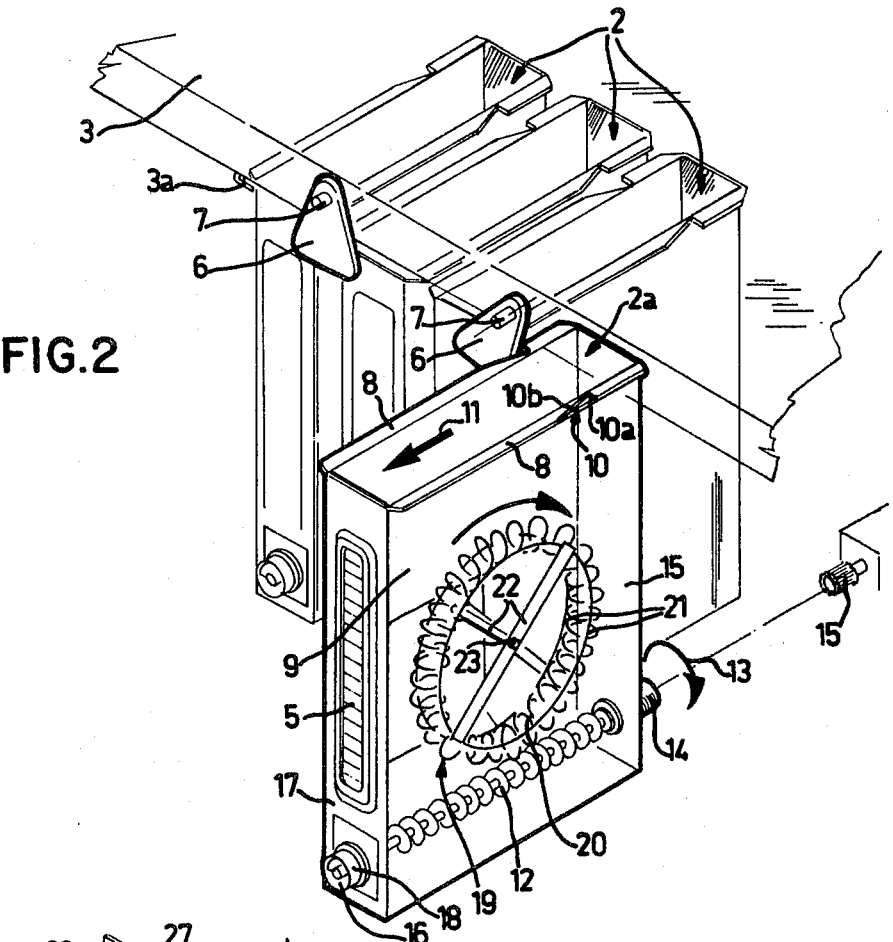
FIG. 2 is a part perspective view schematically illustrating the sliding movement of a hopper along with its internal components.

In particular, inspection of FIG. 2 will show that the front faces of all the hoppers 2 lie in the same plane when they are in the position of utilization pushed back against the back of the cabinet 1. The front face 17 of each hopper 2 has a transparent window 5 provided with a scale making it a simple matter to assess the level of the product inside each hopper.

The various hoppers are locked in the utilization position by means of several locking tabs 6 which are fitted like a pendulum round a pin 7 fixed to the front edge of the support 3 as can be seen in FIG. 2. Each locking tab 6 prevents two hoppers 2 from sliding forward. For this purpose the locking tabs are roughly triangular in shape, with two corners of the triangle coming to block the front face of two hoppers. Rotation of a locking tab 6 manually round its pin 7 enables a hopper 2 like, for example, hopper 2a to be moved forwards.

In FIG. 2 it will be seen in particular that the top edges 8 of the side faces 9 of the hoppers 2 are folded horizontally so as to engage with slideways 3a on support 3. The parallelepiped hoppers 2 are thus hung by the folded top flanges 8. The top flanges 8 have a cutout 10 near their back section comprising a locking edge 10a capable of engaging with the locking tab 6 and a bevelled edge 10b on the front side.

In this way, when a hopper like hopper 2a slides forward in the direction of arrow 11 in FIG. 2, the forwards movement of this hopper is stopped by the rotation of the locking tab 6 which tends to return to its initial position under the action of its own weight round its pendular axis pin 7 and which comes and engages with the back locking flange 10a of the cut-out 10. On the other hand the return movement backwards in the opposite direction is performed with ease, since the locking tab 6 is pushed by the inclined bevelled edge 10b of the cut-out 10, with the locking tab 6 automatically recovering its initial position when the hopper 2a has returned to the dispensing position.

The powder product contained in each hopper is extracted by means of a rotary conveyor screw 12 mounted close to the bottom wall of each hopper. The endless screw 12 is driven in rotation in the direction of arrow 13 by means of a coupling sleeve 14 projecting from the back face 15 of the hoppers 2 and engaging with a drive pinion 15 fixed to the machine frame. The pinion 15 is itself driven in rotation by a geared motor not shown in the figure. The coupling between the sleeve 14 and the drive pinion 15 occurs automatically when the hopper 2a is pushed into the back position. In its rotary motion the conveyor screw 12 moves the powder product up to an opening 16 located on the front face 17 of the hopper and fitted with a projecting sleeve 18.

When it is required to dispense a powder product which tends to form a cavity inside the hopper round the dispenser screw, a scraping device is preferably mounted inside the hopper. Such a device, shaped like a squirrel cage, is illustrated for hopper 2a in FIG. 2. It comprises a toroid-shaped scraper element 19 formed by a stiff metal wire wound in a spiral 20 and provided with spokes 22 fixed to the shaft 23 which is mounted in bearings made in the side faces 9 of the hopper 2 so as to allow free rotation of the scraper element 19. The drive to the latter is achieved simply by meshing the spirally-wound wire 20 with the turns of the conveyor screw 12 which is driven in rotation, as has been seen, by the drive pinion 15. The toroid diameter is such that it takes up roughly the greater part of the internal space of the hopper 2, thus producing suitable stirring of the powder product contained therein.

Figure 3:
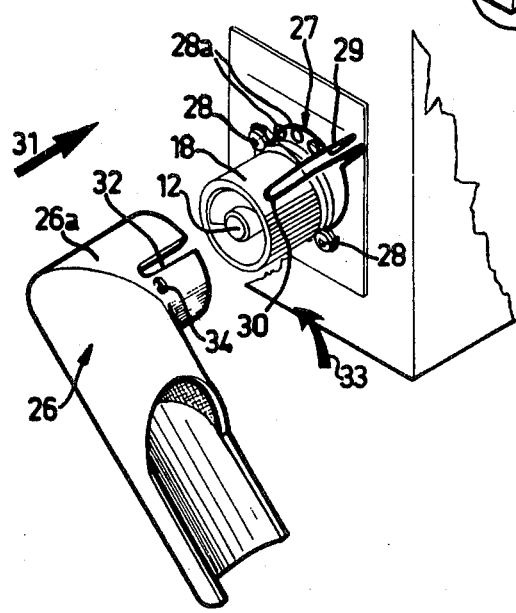
FIG. 3 is a schematic part perspective view illustrating the means of locking the dispensing tubes.

The powder product extracted by the conveyor screw 12 and leaving the opening 16 through the sleeve 18 must be conveyed to the mixing components 24 by the funnels 25 (FIG. 1). For this purpose the sleeve 18 of each hopper 2 receives a bent dispensing tube 26 which is fitted onto the said sleeve by its horizontal portion 26a (FIG. 3). In order to orient each bent dispensing tube 26 in a preset position so that the powder product is discharged into the right funnel 25, a filiform flexible element 27 is fitted at the base of sleeve 18. The flexible element 27 has two ends for this purpose fixed by diametrically opposite screws 28 capable of entering holes 28a located along several angular directions on the front face 17 of the hopper 2. The mid section 29 of the flexible element 27 is curved so as to form a flexible finger the end 30 of which comes approximately into contact with the outer cylindrical surface of the sleeve 18. In order to mount a bent dispensing tube 26 this is therefore threaded on axially in the direction of arrow 31 in FIG. 3, with the end 30 of the flexible finger 29 entering an axial slot 32 in the horizontal portion 26a so as to determine a correct angular position of the dispensing tube 26. This is then locked into position by a slight rotation in the direction of arrow 33 until the end 30 of the flexible finger 29 enters the circular recess 34 located on the horizontal portion 26a near the bottom of the axial slot 32.

As can be seen in FIG. 1, the powder product, which is mixed with the appropriate liquids in the mixing components (24), is then dispensed by pipes which are concealed by a pipe cover 35 and is then discharged by one of the dispenser nozzles 36 into a cup, not shown, which has been automatically placed in the right position and which is supported by the grating 37.

The appliance according to the invention also comprises, as can be seen in FIG. 1, a plate 38 forming a pan, the side portions of which are slightly inclined towards the housing taking the cup and which takes up roughly the same width as all the hoppers 2. The plate forming the pan 38 is also mounted on horizontal lateral slideways so that it can be slid forward beneath the mixing means 24 during the filling of the hoppers 2 and servicing of the machine. The plate 38 contains a housing 39 which can take a removable receptacle for the cups when they are being filled. The removable receptacle 40 and the grating 37 can be removed from the housing 39 by sliding upwards in vertical slideways not shown in the figure. Furthermore, a channel has been designed between the receptacle 40 and the housing 39 so as to allow waste waters coming from the inclined side portions of the pan-shaped plate 38 to flow away towards the housing 39 and be recovered in the bucket 41 via the discharge pipe 42.

It will be understood that, owing to the special structure of the automatic beverage dispensing machine according to the invention, it is possible to fill the hoppers 2 with ease without having to remove them from the machine completely. In addition it is much easier to service and clean the machine, both owing to the special arrangement of the sliding hoppers 2 and to the existence of the pan-shaped plate 38 which can also slide out and makes it possible, if necessary, to collect any powder products which might fall when the hoppers are being filled, thus preventing the bottom of the machine from being fouled. A spray head, not shown in the figures, can also be provided in order to easily wash the pipe cover 35, the pan 38 and the cup receptacle 40 together, with the waste water and dirt flowing into the channel provided round the housing 39 without fouling the removable cup receptacle 40.

The special construction of the dispensing device of the invention also allows the group of hoppers in the machine to be arranged rationally, the user being able to check the level of the products in the hoppers at a glance on opening the door owing to the transparent graduated rectangular windows fitted to each hopper.

I claim:

1. An automatic mixed beverage vending machine comprising a plurality of means for mixing dry powder products with liquid ingredients to form a mixture, means for delivering the mixture into cups; a plurality of containers for receiving said dry powder products; each said container having a front vertical face, a horizontal bottom face and two lateral vertical faces, said lateral faces having at their upper portions bent edges folded toward the external side of said container, one of said bent edges having a cut-out portion near its rear end defining a locking edge;

a horizontal support means having a plurality of slideway means for engaging said bent edges to suspend said respective containers for sliding movement, a plurality of locking means which are pivotally mounted on said support means, at least one of said locking means lying in front of two adjacent containers to prevent forward movement of said adjacent containers, said locking means being pivotally movable to a position where it lies in front of only one of said adjacent containers so that the other adjacent container may slide forwardly on its slideway means, said locking means being slidable along the bent edge of the forwardly sliding other adjacent container until the locking means engages with said locking edge at the end of said sliding movement.

2. An automatic mixed beverage vending machine according to claim 1 wherein a said cut-out portion is bevelled forwardly from the locking edge whereby the locking means engaged with the cut-out portion does not impede rearward movement of the container on its slideway means.

3. An automatic mixed beverage vending machine according to claim 1 wherein said front vertical faces of the containers are in a common vertical plane.

4. An automatic mixed beverage vending machine according to claim 1 wherein a said container is provided with a discharge opening and a rotary conveyor screw means for moving powder products to said opening.

5. An automatic mixed beverage vending machine according to claim 1 wherein a said locking means has a lower portion which is wider than its upper portion.

6. An automatic mixed beverage vending machine according to claim 5 wherein a said locking means is triangular.

7. An automatic mixed beverage vending machine according to claim 1 wherein a said container contains an internal scraper means, said scraper means comprising a toroid-shaped scraper element made by spirally winding a rigid wire, said scraper element being supported for rotation about its central axis.

8. An automatic mixed beverage vending machine according to claim 7 wherein said container is provided with a rotary conveyor screw which engages between the spiral windings of the scraper element so that rotation of said conveyor screw produces rotational movement of said scraper element.

9. An automatic mixed beverage vending machine according to claim 1 having a plate element which is located beneath the containers, said plate being forwardly slidable from a first position to a second position which it occupies during filling and servicing of the machine, said plate when in said second position being located beneath said containers which have their locking edges engaged by said locking means.

10. An automatic mixed beverage vending machine according to claim 9 wherein said plate, when in its second position, also lies beneath the mixing means.

11. An automatic mixed beverage vending machine according to claim 9 having a receptacle for supporting cups which are being filled by the machine, said receptacle being supported by said plate and being removable from said plate.

12. An automatic mixed beverage vending machine according to claim 11 wherein said plate has a housing means for receiving said receptacle.

13. An automatic mixed beverage vending machine comprising a plurality of means for mixing dry powder products with liquid ingredients to form a mixture, means for delivering the mixture into cups; a plurality of containers for receiving said dry powder products; a horizontal support means having a plurality of slideway means adapted to engage and suspend said containers while allowing translatory movement of said containers from a first retracted distributing position to a second extended charging position; a plate element having substantially the same width as said plurality of containers; said plate element being supported for sliding movement between a first operating position which it occupies during normal operation of the machine and a second position which it occupies during filling and servicing of the machine, said plate when in its second position being located beneath a container which is in its said charging position, said plate when in its second position being operable to prevent fouling of the machine if any powder products overflow the container being filled, a receptacle for supporting cups which are being filled by the machine, said receptacle being supported by said plate and being removable from said plate, said plate having a housing means for receiving said receptacle.

14. An automatic mixed beverage vending machine according to claim 13 wherein said plate, when in its second position, also lies beneath the mixing means.

15. An automatic mixed beverage vending machine according to claim 13 wherein said plate is sloped downwardly toward said housing.

16. An automatic mixed beverage vending machine according to claim 13 wherein said containers have front faces which lie in a common plane when the containers are in their distributing positions.

* * * * *